(12) United States Patent
Yoshioka et al.

(10) Patent No.: US 6,220,321 B1
(45) Date of Patent: Apr. 24, 2001

(54) HEAVY DUTY TIRE INCLUDING WIDE MAIN GROOVES, NARROW GROOVES AND LUG GROOVES

(75) Inventors: Shigeki Yoshioka, Akashi; Yoshiyuki Takada, Kobe; Hidekatsu Nakatsuji, Akashi, all of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/229,985

(22) Filed: Jan. 14, 1999

(30) Foreign Application Priority Data

Jan. 19, 1998 (JP) .................................................. 10-007610

(51) Int. Cl.[7] .......................... B60C 11/12; B60C 11/13; B60C 101/00; B60C 103/00
(52) U.S. Cl. ................................ 152/209.18; 152/209.22; 152/209.25; 152/209.27; 152/DIG. 3
(58) Field of Search ........................ 152/209.18, 209.21, 152/209.22, 209.25, 209.27, DIG. 3

(56) References Cited

U.S. PATENT DOCUMENTS

| | | | | |
|---|---|---|---|---|
| 2,186,180 | * | 1/1940 | Sloman et al. | 152/DIG. 3 |
| 2,926,715 | * | 3/1960 | Constantakis | 152/DIG. 3 |
| 5,804,000 | * | 9/1998 | Shirai et al. | 152/DIG. 3 |
| 5,909,756 | * | 6/1999 | Miyazaki | 152/DIG. 3 |
| 6,003,575 | * | 12/1999 | Koyama et al. | 152/209.27 |

FOREIGN PATENT DOCUMENTS

| | | | | |
|---|---|---|---|---|
| 370747 | * | 5/1990 | (EP) | 152/209.25 |
| 586124 | * | 3/1994 | (EP) | 152/209.25 |
| 773117 | * | 5/1997 | (EP) | 152/209.27 |
| 59-209903 | * | 11/1984 | (JP) | 152/DIG. 3 |
| 7-172112 | * | 7/1995 | (JP) | 152/209.21 |

* cited by examiner

*Primary Examiner*—Steven D. Maki
(74) *Attorney, Agent, or Firm*—Birch, Stewart, Kolach Birch, LLP

(57) ABSTRACT

A heavy duty tire is provided in the tread portion with a circumferentially extending main groove on each side of the tire equator, a circumferentially extending narrow groove on each side of each main groove, lug grooves extending from the tread edges to the axially inner narrow grooves, and slits extending between the inner narrow grooves so as to form a rib-like portion between the two inner narrow grooves, first blocks between the inner narrow groove and main groove, second blocks between the main groove and axially outer narrow groove, and third blocks between the outer narrow groove and tread edge; the main grooves are disposed at a distance of 15 to 25% of the tread width from the tire equator; the main groove depth is 10 to 12% of the tread width; the narrow groove depth is less than the main groove depth; and the slit depth is 0.2 to 0.3 time the main groove depth.

14 Claims, 6 Drawing Sheets

HEAVY DUTY TIRE INCLUDING WIDE MAIN GROOVES, NARROW GROOVES AND LUG GROOVES

BACKGROUND OF THE INVENTION

The present invention relates to a pneumatic tire, more particularly to an tread portion of a heavy duty tire being capable of improving wear resistance and wet performance.

Recently, circumferentially extending wide main grooves in heavy duty tires for a truck, bus and the like have been increasingly used for wet performance. In North America, for example, there is a tendency to use tires having deep main grooves on drive wheels in order to prevent accidents due to slipping. In the case of deep main grooves, however, tread rubber on both sides of the deep main grooves is liable to move during running, and as a result, uneven wear is liable to occur. This is especially remarkable when the hardness of tread rubber is decreased for wet grip and the like. To put it more concretely, as shown in FIG. 5 for example, in case the of a tread pattern in which a circumferential main groove (e) is disposed on each side of the tire equator C, and a plurality of blocks b1, b2 are disposed on each side of the main groove (e), the following uneven wear occurs: so called "block edge wear" in which the blocks b1 and b2 wear partially on the axially outer edge more than the inner edge (indicated by right side upward hatching); and so called "step down wear" in which the full surface of the blocks b2 located on the inside of the vehicle wears faster than others (indicated by left side upward hatching).

SUMMARY OF THE INVENTION

It is therefore, an object of the present invention to provide a heavy duty tire, in which uneven wear is effectively prevented without decreasing the depth of circumferential main grooves to maintain wet performance.

According to one aspect of the present invention, a heavy duty tire comprises a tread portion with tread edges, the tread portion provided with a circumferentially extending wide main groove on each side of the tire equator C, a circumferentially extending outer narrow groove on the axially outside of the main groove, a circumferentially extending inner narrow groove on the axially inside of the main groove, and lug grooves extending axially inwardly from the tread edges to the inner narrow grooves so that the tread portion is divided into a rib-like portion between the two inner narrow grooves, first blocks between the inner narrow groove and the main groove, second blocks between the main groove and the outer narrow groove, and third blocks between the outer narrow groove and the adjacent tread edge, the above-mentioned main groove spaced apart from the tire equator by an axial distance of from 15 to 25% of the tread width, the main groove having a groove depth of from 10 to 12% of the tread width, the inner and outer narrow grooves having a depth less than that of the main groove, the above-mentioned rib-like portion provided with slits extending from one of the inner narrow grooves to the other, and the slits having a depth of from 0.2 to 0.3 time the depth of the main groove.

Here, the tread width is the axial distance between the tread edges or the maximum ground contacting width between the axial outermost edges of the ground contacting region under such a condition that the tire is mounted on its standard rim and inflated to its standard pressure, and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The widths and depths of various grooves, slits and the like are measured under the standard unloaded condition in which the tire is mounted on the standard rim and inflated to the standard pressure, but loaded with no tire load.

DESCRIPTION OF THE PREFERRED EMBODIMENTS

Figure 1:
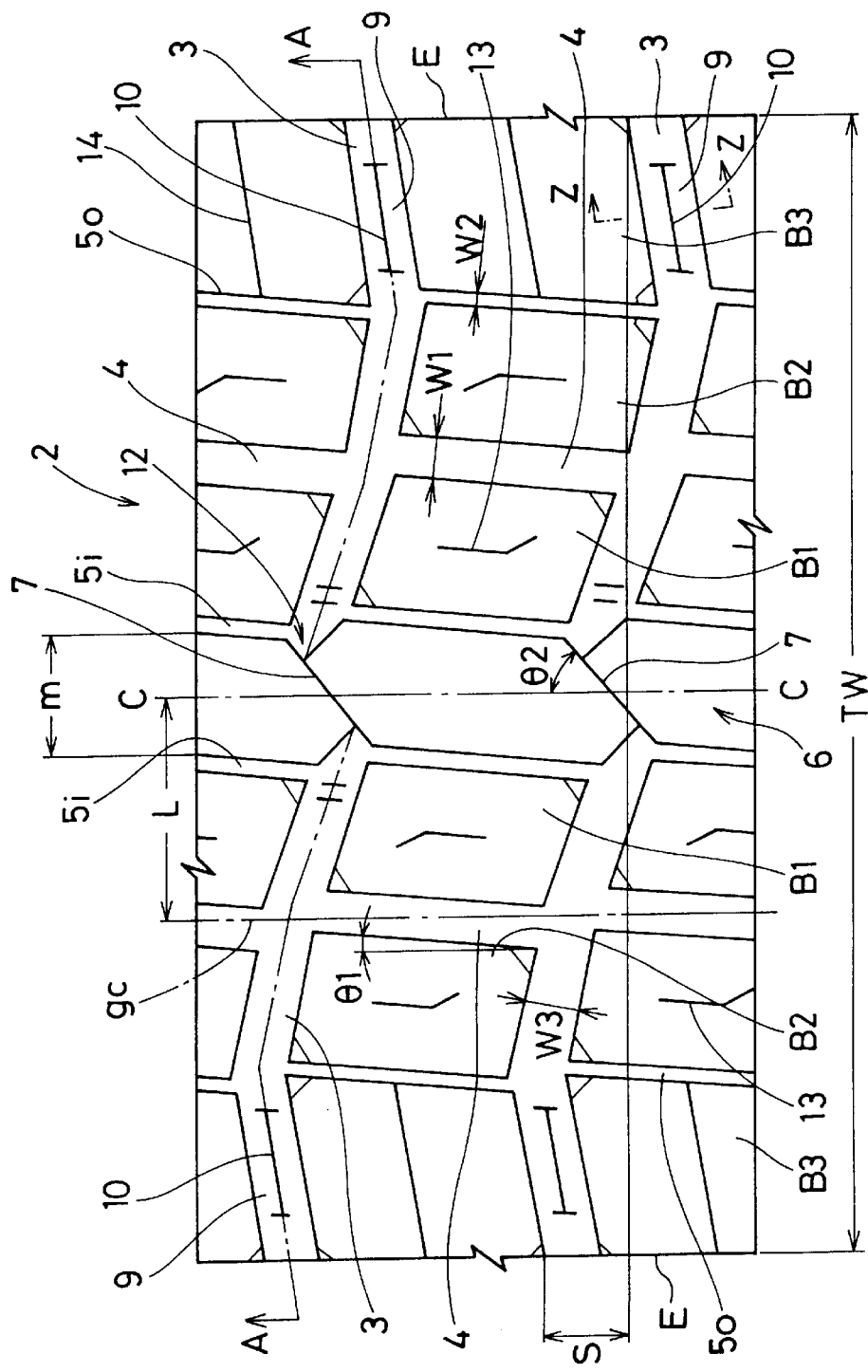
FIG. 1 is a developed plan view of an embodiment of the present invention showing an example of the tread pattern.

An embodiment of the present invention will now be described in detail in conjunction with the accompanying drawings.

The tire according to the present invention usually comprises a tread portion 2 having tread edges E, a pair of sidewall portions extending radially inwardly from the tread edges E, a bead portion disposed at the axially inner end of each sidewall portion, a carcass extending between the bead portions, and a belt disposed radially outside the carcass in the tread portion 2.

The tread portion 2 is provided with lug grooves 3 each extending continuously from one of the tread edges E to a position near but before the tire equator C. The lug grooves 3 have a groove width W3 of 2.5 to 7%, preferably 3 to 6% of the tread width TW and a groove depth d3 of 10 to 12% of the tread width TW. In this example, the lug grooves 3 on one side of the tire equator C are circumferentially shifted from those on the other side, and the shift S is set in the range of from 5 to 10% of the tread width TW.

The tread portion 2 is further provided on each side of the tire equator C with a main groove 4 extending circumferentially of the tire across the lug grooves 3. The main grooves 4 are a deep groove having a groove depth d1 of from 10 to 12% of the tread width TW. The main grooves 4 are disposed such that the center line gc is located within a range from 15 to 25% of the tread width TW from the tire equator C. That is, the axial distance L of the center line gc from the tire equator C is within this range. The angle θ1 of the main grooves 4 is set in the range of from 0 to 10 degrees, preferably more than 0 but less than 10 degrees with respect to the circumferential direction. (in this example about 7 degrees)

In this embodiment, the main grooves 4 and lug grooves 3 are the same depth. However, it is possible that the lug grooves 3 are shallower than the main grooves 4.

The tread portion 2 in this embodiment is further provided on each side of the tire equator C with an inner narrow groove 5i and an outer narrow groove 5o which are narrower and shallower than the main grooves 4. The groove width W2 thereof is in the range of from 1.0 to 1.6% of the tread width TW, and the groove depth d2 thereof is in the range of from 7 to 9% of the tread width TW. The inner groove 5i and outer groove 5o are disposed on the axially inside and outside of the main groove 4, respectively, and extend circumferentially across the lug grooves 3.

Therefore, the tread portion 2 is divided into: a rib-like portion 6 defined between the two inner narrow grooves 5i and extending on the tire equator; two rows of first blocks B1, each block defined by the adjacent lug grooves 3, one of the main grooves 4, and the adjacent inner narrow groove 5i; two rows of second blocks B2, each block defined by the adjacent lug grooves 3, one of the main grooves 4, and the adjacent outer narrow groove 5o; and two rows of third blocks B3, each block defined by the adjacent lug grooves 3, one of the tread edges E, and the adjacent outer narrow grooves 5i.

In this embodiment, the lug grooves 3 on each side of the tire equator C are substantially parallel with each other. The main groove 4, narrow grooves 5i and 5o are substantially parallel with each other. The "substantially parallel" means that the angle difference is within a range of plus/minus 2 degrees.

Figure 5:
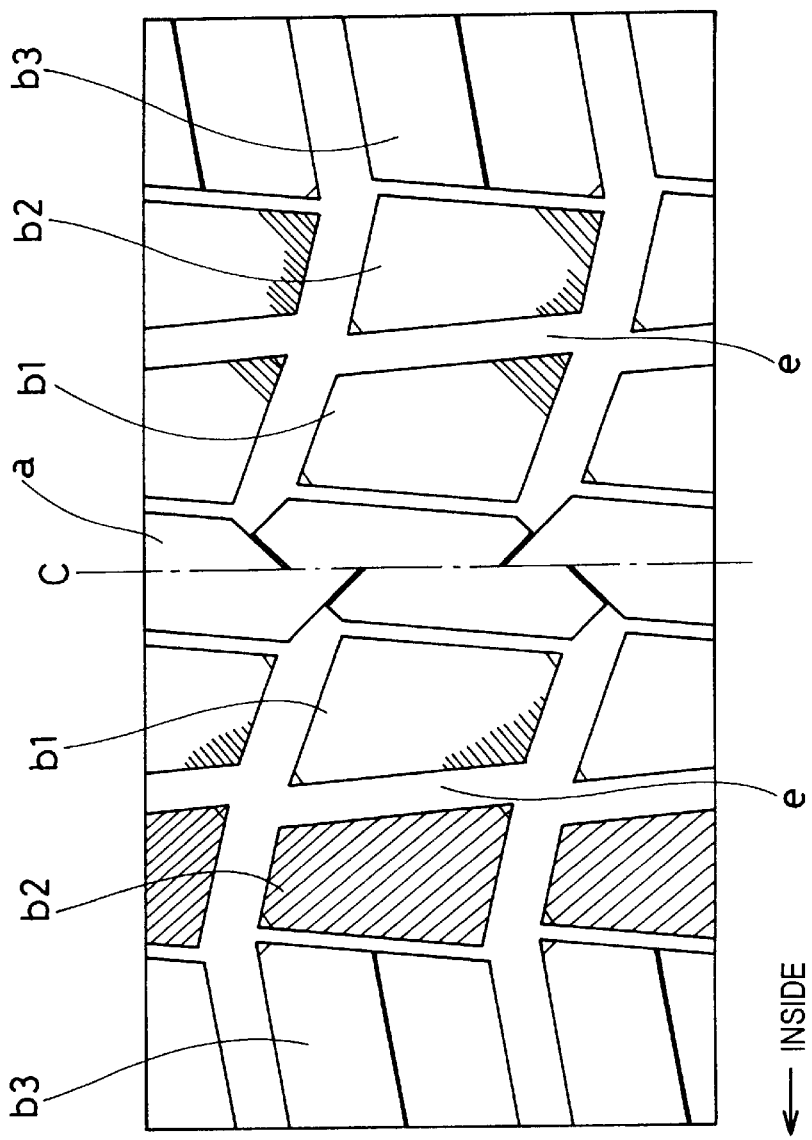
FIG. 5 is a developed plan view showing the tread pattern of a reference tire used in comparison tests.

Accordingly, the first and second blocks B1 and B2 are a parallelogram. In comparison with trapezoidal blocks b1 and b2 as shown in FIG. 5, the ground contacting area of parallelogram blocks can be increased even under steering.

The maximum axial width (m) of the rib-like portion 6 or the axial distance between the two inner narrow grooves 5i is set in the range of not less than 7%, preferably not less than 9%, more preferably not less than 11% of the tread width TW.

As the two inner narrow grooves 5i are parallel in this embodiment, the axial width is generally constant, but due to the axially inner end portions 12 of the lug grooves 3 extending into this portion 6, the axial width is periodically decreased along the circumferential direction.

Further, the rib-like portion 6 is provided with a plurality of slits 7 each extending from one of the inner narrow grooves 5i to the other. The slits 7 have a groove width in the range of from about 0.5 to 3.0 mm, preferably 1.0 to 3.0 mm, more preferably 1.0 to 2.0 mm, and a minimum depth d4 in the range of from 0.2 to 0.3 time the groove depth d1 of the main grooves 4.

Figure 4:
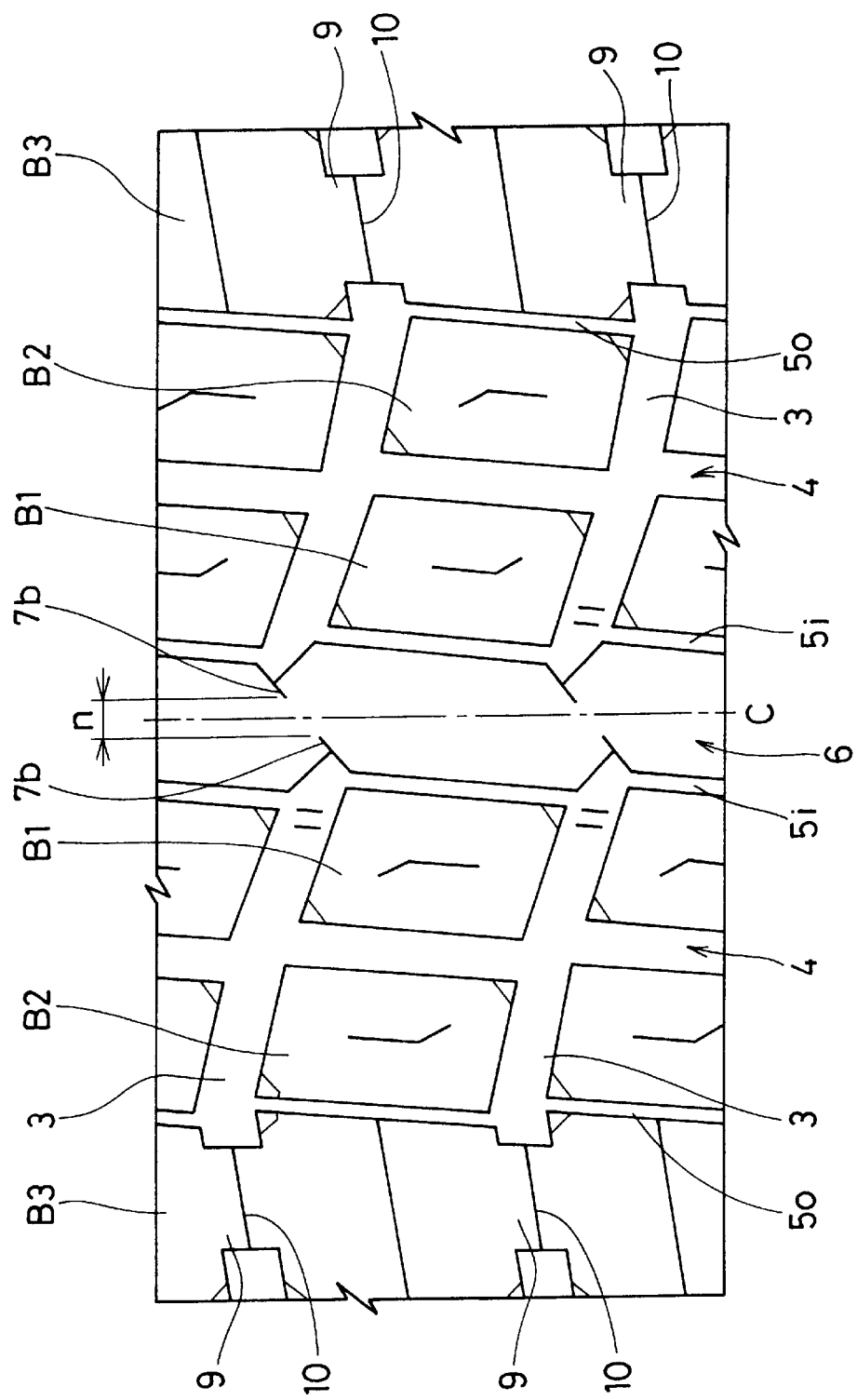
FIG. 4 is a developed plan view showing a state that the tread portion shown in FIG. 1 is worn about 25%.

Therefore, when the tire is new, the slits 7 decrease the rigidity of the rib-like portion 6 close to the block rigidity. As a result, concentration of wear on the blocks B1 and B2 can be effectively avoided. On the other hand, when the tread wear reaches to the minimum depth d4, the circumferential continuity of the portion 6 is enhanced as shown in FIG. 4. Accordingly, the rigidity of the rib-like portion 6 increases, and at the same time, the block rigidity also increases. Therefore, the occurrence of large rigidity difference and accordingly uneven wear can be avoided.

Preferably, the slits 7 are inclined at an angle θ2 of from 30 to 60 degrees with respect to the circumferential direction.

In this example, the slits 7 extend between the axially adjacent inner ends 12 of the lug grooves 3, and all incline in one direction. Accordingly, the circumferential pitches thereof are the same as the lug grooves 3.

Figure 2:
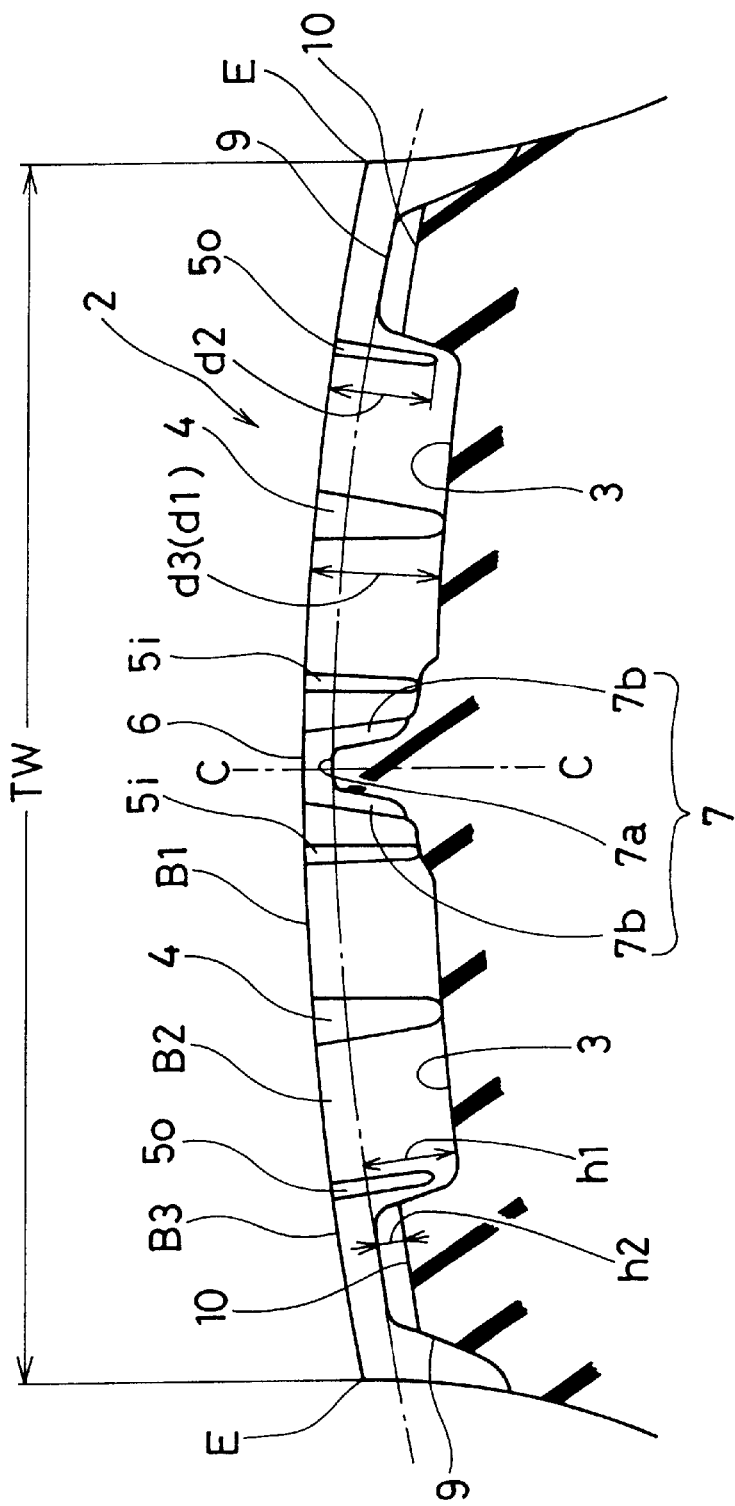
FIG. 2 is a cross sectional view taken along a line A—A of FIG. 1.
Figure 3:
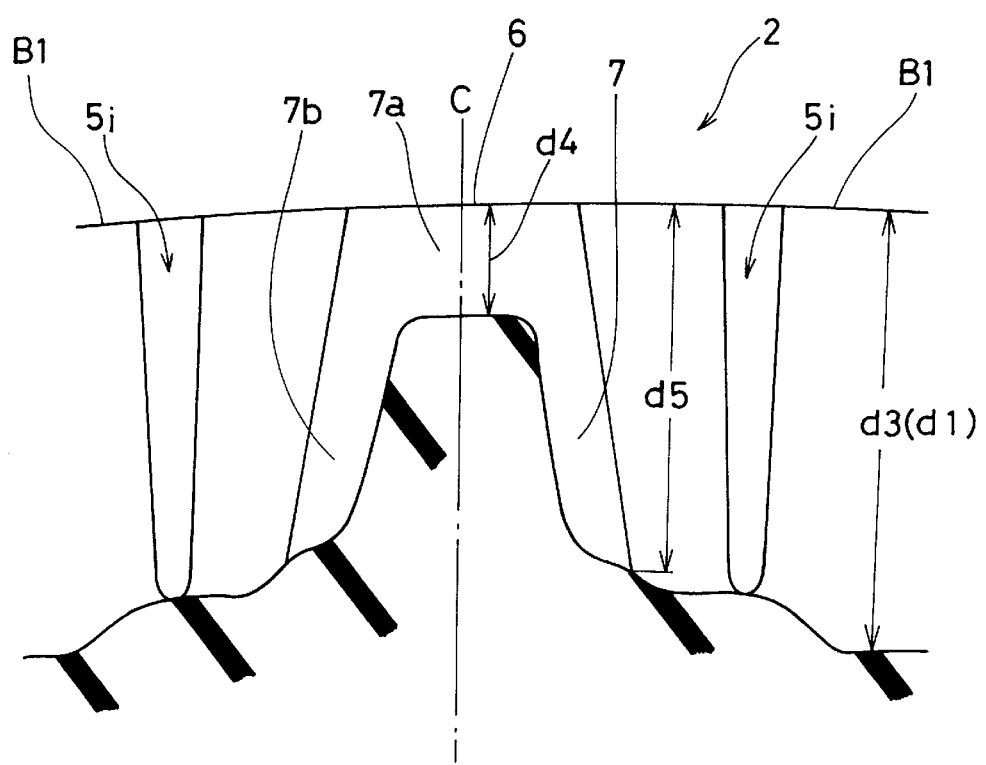
FIG. 3 is an enlarged sectional view of the rib-like portion of FIG. 2

Further, as shown in FIGS. 2 and 3, each slit 7 has a shallow part 7a and a deep part 7b, 7b on each side of the shallow part 7a.

The maximum depth d5 in the deep parts 7b and 7b is less than the depth d1 of the main grooves 4. (d4<d5<d1) Preferably, the maximum depth d5 is set in the range of from 0.5 to 0.9 times, more preferably 0.7 to 0.9 times the main groove depth d1. In FIG. 3, the shallow part 7a has a substantially constant depth (=d4), and the axial width (n) thereof is preferably set to be at least about 2 to 5% of the tread width TW. Contrary, the depth of the deep parts 7b increases abruptly towards the inner groove 5i.

As shown in FIG. 4 showing the tread pattern when the tread wear reaches to about 25%, the rib-like portion 6 continues in the circumferential direction by the shallow part 7a while the slits 7 remain on both sides thereof.

In this embodiment, in order to improve road contact, the first and second blocks B1 and B2 are each provided with at least one cut 13 which extends generally in the circumferential direction but ends with in the block.

Figure 6:
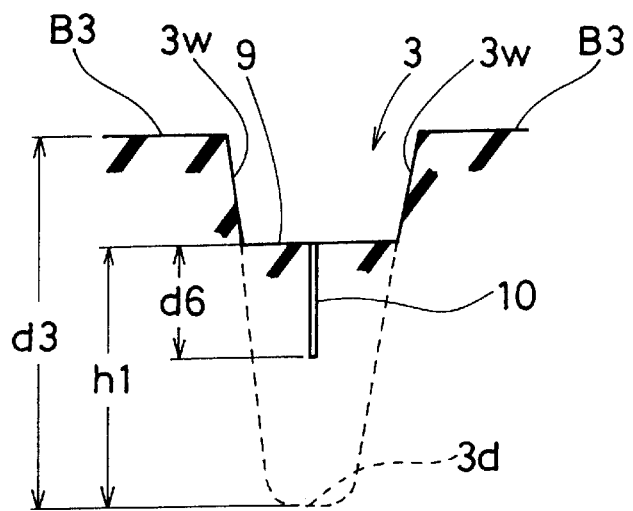
FIG. 6 is a cross sectional view taken along a line Z—Z of FIG. 1.

Further, as shown in FIGS. 1, 2 and 6, each of the lug grooves 3 is provided with a tie bar 9 extending between the side faces 3w of the circumferentially adjacent third blocks B3. The tie bar 9 protrudes from the groove bottom 3d up to a height h1 of 0.7 to 0.8 times the groove depth d3. The length of the tie bar 9 is preferably less than the minimum length of the third block B3 when measured along the longitudinal direction of the lug groove. Therefore, uneven wear in the shoulder blocks B3 so called "shoulder wear" can be improved. Preferably, the tie bar 9 is provided with a cut 10 extending along the center line of the lug groove 3 over the entire length of the tie bar, which helps to improve uneven wear of the second blocks B2. Also the third block B3 is provided with an axially extending cut 14.

Figure 7:
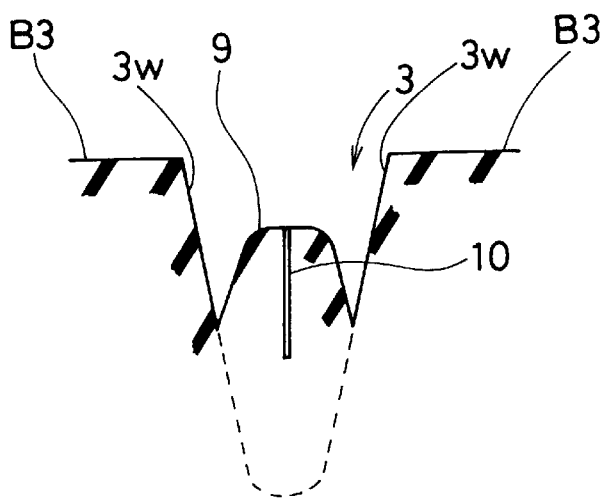
FIG. 7 is cross sectional view showing another example of the tie bar.

FIG. 7 shows another example of the tie bar 9 in which the top surface thereof is convex whereas the top surface of the tie bar shown in FIG. 6 is flat.

Test tires of size 295/75R22.5 having the same internal structure were made by way of test. The test tires were mounted on the front wheels of a 2-D-D-4-4 wheel type truck, and a stationary steering was applied thereto on an asphalt road by turning the steering wheel 720 degrees. Then, with respect to the first and second blocks in the ground contacting patch, the percentage of the area not contacting with the ground was obtained. The results are as follows:

TABLE 1

| Tire | Ex. | Ref. |
| --- | --- | --- |
| Tread pattern | FIG. 1 | FIG. 5 |
| Non-contact area (%) | | |
| First block | 7.5 | 10 |
| Second block | 12 | 15 |

Rim size: 8.25×22.5
Inner pressure: 750 KPa

As shown in Table 1, the example tire could be improved in non-contact area of both the first and second blocks, and thereby uneven wear was improved.

Further, the above-mentioned test vehicle was run, under wet condition, on a special test course in which the ground contacting state of the tread can be observed visually, for example to record by a video camera. And to evaluate the block's slip in the traveling direction, the percentage of the ground contacting length of the second block during running to that under the stationary state was obtained. The results are as follow.

TABLE 2

| Tire | Ex. | Ref. |
| --- | --- | --- |
| Variation (%) of the ground contacting length | 97 to 103 | 96 to 104 |
| Range of variation (%) | 6 | 8 |

As shown in Table 2, the variation of the example tire could be reduced.

Furthermore, the test vehicle provided on the drive wheels with the test tires was run for 50,000 miles (this corresponds to about 20% tread wear) and then the second blocks were measured for step-down wear to obtain the number of tires in which step-down wear was occurred. Further, the total running distance until the end of tread wear life was obtained. The test results are shown in the following Table 3.

TABLE 3

| Tire | Ex. | Ref. |
| --- | --- | --- |
| Step-down wear | | |
| Tire number | 5 | 8 |
| Incidence | 16%(5/32) | 25%(8/32) |
| Runable distance | | |
| av. (mile) | 250,000 | 220,000 |

It was confirmed that the example tire could be improved in step-down wear and tread wear life.

The present invention is suitably applied to a belted radial tire provided with a steel cord carcass. But it is also possible to apply to a bias tire. Especially, the above-explained embodiment tire is suitably used as a tire for front or drive wheels of trucks, buses and the like.

What is claimed is:

1. A heavy duty tire comprising:
    a tread portion with tread edges, the tread portion provided with
    a circumferentially extending wide main groove on each side of a tire equator,
    a circumferentially extending outer narrow groove axially outside of each main groove,
    a circumferentially extending inner narrow groove axially inside of each main groove, and
    lug grooves extending axially inwardly from each tread edge to the inner narrow groove so that the tread portion is divided into
    a rib portion between the two inner narrow grooves,
    first blocks between the inner narrow groove and the main groove,
    second blocks between the main groove and the outer narrow groove, and
    third blocks between the outer narrow groove and the tread edge,
    the main groove being spaced apart from the tire equator by an axial distance of from 15 to 25% of the tread width between the tread edges,
    the main groove having a groove depth of from 10 to 12% of the tread width,
    the inner and outer narrow grooves having a depth less than that of the main groove,
    the rib portion provided with slits extending from one of the inner narrow grooves to the other of the inner narrow grooves,
    the slits having a depth of from 0.2 to 0.3 times the depth of the main groove, wherein
    the first blocks and second blocks are substantially a parallelogram, and segments of the circumferential main grooves and narrow grooves adjacent to the first blocks and second blocks are inclined towards the same direction at an angle Θ1 of from more than 0 to 10 degrees with respect to the circumferential direction,
    the lug grooves are provided between the circumferentially adjacent third blocks with tie bars, and each of the tie bars is provided with a cut extending in the longitudinal direction of the lug groove along the length of the tie bar,
    the lug grooves on one side of the tire equator are shifted in the circumferential direction from those on the other side by 5 to 10% of the tread width, and
    each said slit has a shallow part and a deep part on each side of the shallow part.
2. The heavy duty tire according to claim 1, wherein the cut has a constant depth.
3. The heavy duty tire according to claim 1, wherein the main groove and narrow grooves are substantially parallel with each other.
4. The heavy duty tire according to claim 1, wherein the main grooves and lug grooves are the same depth.
5. The heavy duty tire according to claim 1, wherein the inner narrow groove and outer narrow groove have a width in the range of from 1.0 to 1.6% of the tread width, and a depth in the range of from 7 to 9% of the tread width.
6. The heavy duty tire according to claim 1, wherein the axial distance between the two inner narrow grooves is set in the range of not less than 7% of the tread width.
7. The heavy duty tire according to claim 1, wherein the lug grooves have a width in the range of from 2.5 to 7% of the tread width and a depth in the range of from 10 to 12% of the tread width.
8. The heavy duty tire according to claim 1, wherein the lug grooves on each side of the tire equator are substantially parallel with each other.
9. The heavy duty tire according to claim 1, wherein the slits have a width in the range of from about 0.5 to 3.0 mm.
10. The heavy duty tire according to claim 1, wherein the slits are inclined at an angle Θ2 of from 30 to 60 degrees with respect to the circumferential direction.
11. The heavy duty tire according to claim 1, wherein the depth of each said slit at the deep part is in the range of from 0.5 to 0.9 times the depth of the main groove.
12. The heavy duty tire according to claim 1, wherein the shallow part of each said slit has a substantially constant depth.
13. The heavy duty tire according to claim 1, wherein a height of the tie bar from the groove bottom of the lug groove is in the range of from 0.7 to 0.8 times the groove depth of the lug groove.
14. The heavy duty tire according to claim 1, wherein the length of the tie bar is less than the minimum length of the third block when measured along the longitudinal direction of the lug groove.

* * * * *